(12) United States Patent
Kamada et al.

(10) Patent No.: US 7,976,176 B2
(45) Date of Patent: *Jul. 12, 2011

(54) LIGHTING UNIT, BACKLIGHT UNIT, AND LIQUID CRYSTAL DISPLAY DEVICE

(75) Inventors: Kentaro Kamada, Kameyama (JP); Mitsuhiro Moriyasu, Suzuka (JP); Keiji Hayashi, Kameyama (JP); Ryoh Hatakeyama, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

This patent is subject to a terminal disclaimer.

(21) Appl. No.: 12/067,319

(22) PCT Filed: Jun. 13, 2006

(86) PCT No.: PCT/JP2006/311870
§ 371 (c)(1),
(2), (4) Date: Mar. 19, 2008

(87) PCT Pub. No.: WO2007/037047
PCT Pub. Date: Apr. 5, 2007

(65) Prior Publication Data
US 2009/0046446 A1 Feb. 19, 2009

(30) Foreign Application Priority Data
Sep. 28, 2005 (JP) .................................. 2005-283093

(51) Int. Cl.
*G09F 13/04* (2006.01)
(52) U.S. Cl. ...................................... 362/97.3; 362/231
(58) Field of Classification Search .................. 362/227, 362/228, 230, 231, 600–634, 97.3
See application file for complete search history.

(56) References Cited

U.S. PATENT DOCUMENTS

| | | | | |
|---|---|---|---|---|
| 6,666,567 B1* | 12/2003 | Feldman et al. | | 362/237 |
| 6,840,646 B2* | 1/2005 | Cornelissen et al. | | 362/606 |
| 7,252,409 B2* | 8/2007 | Kim | | 362/294 |
| 7,597,451 B2* | 10/2009 | Chikazawa et al. | | 362/231 |
| 2003/0210222 A1* | 11/2003 | Ogiwara et al. | | 345/103 |
| 2005/0099791 A1* | 5/2005 | Nagel | | 362/31 |
| 2005/0141217 A1* | 6/2005 | Kim | | 362/225 |
| 2006/0002107 A1* | 1/2006 | Jeong | | 362/225 |
| 2006/0002143 A1* | 1/2006 | Gu et al. | | 362/612 |
| 2006/0007682 A1* | 1/2006 | Reiff et al. | | 362/253 |
| 2006/0146570 A1* | 7/2006 | Park | | 362/613 |

FOREIGN PATENT DOCUMENTS

| | | |
|---|---|---|
| JP | 2002-063804 A | 2/2002 |
| JP | 2003-187623 A | 7/2003 |
| JP | 2003-330424 A | 11/2003 |
| JP | 2004-139876 A | 5/2004 |

OTHER PUBLICATIONS

Official communication issued in counterpart International Application No. PCT/JP2006/311870, mailed on Sep. 19, 2006.
Kentaro Kamada et al.; "Lighting Unit, Backlight Unit, Liquid Crystal Display Device"; U.S. Appl. No. 12/067,334, filed Mar. 19, 2008.

* cited by examiner

*Primary Examiner* — Julie A Shallenberger
(74) *Attorney, Agent, or Firm* — Keating & Bennett, LLP

(57) ABSTRACT

In a lighting unit, fluorescent lights and LEDs having different spectroscopic characteristics are alternately arranged in a direction X on an irradiation plane. The fluorescent lights are arranged in certain intervals so as to provide uniform light intensity even around the end portions of the direction X. The LEDs installed at the ends of the direction X have a light intensity that is weaker than that of other LEDs in order to provide uniform light intensity around the end portions. As a result, the lighting unit provides uniform light intensity across the entire irradiation surface.

12 Claims, 8 Drawing Sheets

LIGHTING UNIT, BACKLIGHT UNIT, AND LIQUID CRYSTAL DISPLAY DEVICE

BACKGROUND OF THE INVENTION

1. Field of the Invention

The present invention relates to a lighting unit including two types of light sources, to a backlight unit including such a lighting unit, and to a liquid crystal display device equipped with the backlight unit.

2. Description of the Related Art

A liquid crystal display device is usually configured such that a backlight unit supplies a display light since a display element is non-emissive. As FIG. 7 illustrates, there is a configuration in which an optical member such as a diffusing plate (not shown in FIG. 7) is combined with a lighting unit 100 including a plurality of aligned white light sources 101 such that display light is provided uniformly in an in-plane direction of a display surface of the liquid crystal display device.

Fluorescent lights are usually used as white light sources 101 in the lighting unit 100. The use of fluorescent light has a problem that color purity of display light generated by fluorescent light is low since light purity of R is generally lower than that of G or B in the fluorescent light.

Therefore, in order to improve color reproducibility of an image on a liquid crystal display device, Japanese Unexamined Patent Application Publication No. 2004-139876 discloses a backlight unit shown in FIG. 8, which includes the optical members and a lighting unit 110 including two types of light sources; fluorescent lights 111 and LEDs (Light Emitting Diodes) 112.

In the lighting unit 110, red spectrum characteristics are eliminated from the fluorescent lights 111; therefore, the fluorescent lights 111 having only blue spectrum characteristics and green spectrum characteristics are used. Combinational use of those fluorescent lights 111 with the LEDs 112 having red spectrum characteristics generates high color purity in R, G, and B. As a result, the lighting unit 110 provides high color reproducibility.

Japanese Unexamined Patent Application Publication No. 2003-187623 also discloses a lighting unit including LEDs of plural types for emitting light of different colors.

However, the conventional configuration disclosed in Japanese Unexamined Patent Application Publication No. 2004-139876 experiences a problem described below.

That is, in the lighting unit 110 in Japanese Unexamined Patent Application Publication No. 2004-139876, the two types of light sources must be arranged on an irradiation plane without overlapping each other. Thus, the lighting unit 110 cannot obtain the uniform display light in the both types of light sources.

Take FIG. 8 as an example, when a pitch between neighboring fluorescent lights 111 is 2L, a pitch between the endmost fluorescent light 111 and an end portion of the lighting unit 110 is L. As a result, light outgoing from the fluorescent lights 111 will be uniform. On the other hand, the LEDs 112 are arranged respectively between the fluorescent lights 111. Therefore, when a pitch between the neighboring LEDs 112 is 2L, a pitch between the endmost LED 112 and the end portion of the lighting unit 110 is 2L. As a result, the light intensity of the light outgoing from the LEDs 112 is insufficient at the end portions. Thus, the display light around the end portions of the lighting unit is bluish due to insufficient red light intensity.

SUMMARY OF THE INVENTION

In order to overcome the problems described above, preferred embodiments of the present invention provide a lighting unit in which a uniform light intensity across the entire irradiation plane is achieved.

A lighting unit according to a preferred embodiment of the present invention includes first light sources and second light sources, having different spectroscopic characteristics and being alternately arranged in a first array direction on an irradiation plane, and arranged such that at least either the first light source or the second light source that is at an endmost position at least one of the ends in the first array direction includes an auxiliary light source, whose light intensity is weaker than light intensity of the other light sources identical with the auxiliary light source in spectroscopic characteristics. As described above, in the lighting unit where the first light sources and the second light sources having different spectroscopic characteristics are alternately arranged in the first array direction, those two types of light sources must be arranged without overlapping each other. Therefore, the conventional configuration, where light sources of equal light intensity are regularly arranged for the first light sources and the second light sources, respectively, cannot provide uniform display light in both types of light sources particularly around the end portions.

On the other hand, according to the configuration of a preferred embodiment of the present invention, either the first light sources or the second light sources are arranged such that substantially uniform light intensity can be obtained around the end portions in the first array direction whereas the other light source located at an endmost position at least one of the ends of the first array direction includes the auxiliary light source whose light intensity is weaker than the light intensity of the other light sources identical with the auxiliary light source in spectroscopic characteristics. With this unique configuration, substantially uniform light intensity can be obtained around the end portions in the first array direction.

Consequently, in the lighting unit including the first light sources and the second light sources having different spectroscopic characteristics, uniform light intensity is achieved over the entire irradiation plane.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be explained below with reference to FIGS. 1 to 6. First, a configuration of a preferred embodiment of the present invention will be explained briefly below with reference to FIG. 1.

Figure 1:
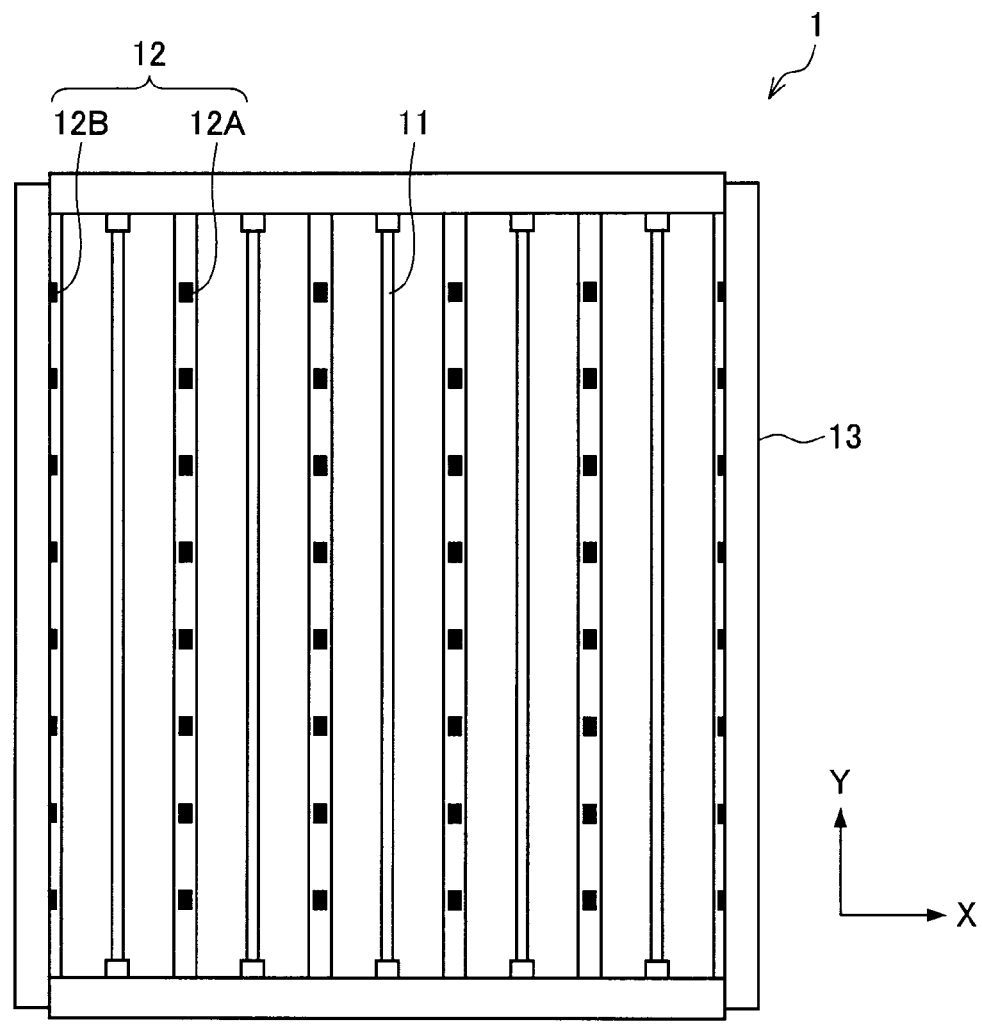
FIG. 1 is a view illustrating a preferred embodiment of the present invention, schematically illustrating a configuration of a lighting unit.
Figure 1:
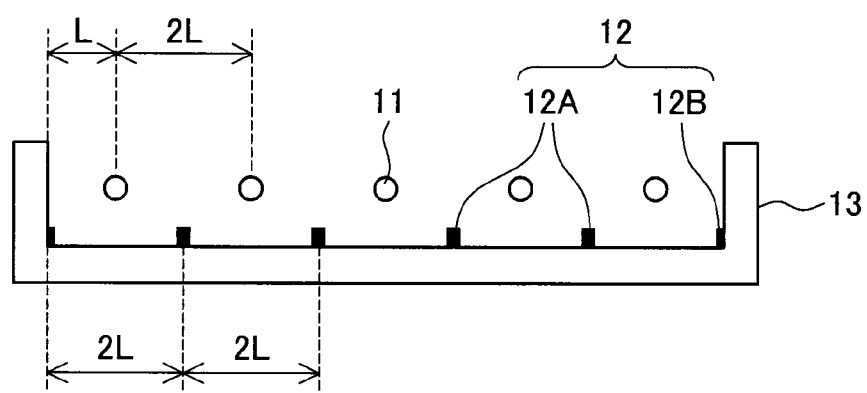

A lighting unit 1 of FIG. 1 is preferably used in a backlight unit of a transmissive, or transmissive-reflective, liquid crystal display device, and includes two types of light sources to improve color reproducibility of the image on the display device. More specifically, the lighting unit 1 includes, in a chassis 13, plural fluorescent lights 11 as first light sources and plural LEDs 12 as second light sources. The fluorescent lights 11 and the LEDs 12 are alternately arranged in direction X in FIG. 1 (first array direction).

The first light sources have at least one of emissive spectra R, G, and B while the second light sources have the remaining emissive spectra. Any fluorescent lights high in power efficiency (for example, cold-cathode tubes) are preferably used as the first light sources in a preferred embodiment of the present invention, but first light sources are not limited to particular kinds of fluorescent lights. Likewise, the second light sources are not limited to LEDs and may be such light sources as electro-luminescent light sources instead of the LEDs. The second light sources preferably have wide radiation directivities. The second light sources also preferably exceed the first light sources in number installed. It is also preferred that the first light sources are driven by a DC/AC conversion driving method with an electric transformer while the second light sources are preferably driven by a direct-current voltage inputting method. A configuration using the LEDs for the second light sources is explained below.

Suppose, for example, that red spectrum characteristics are eliminated from the fluorescent lights 11; therefore, the fluorescent lights 11 have blue spectrum characteristics and green spectrum characteristics only. The LEDs 12 having red spectrum characteristics are combined with those fluorescent lights. Consequently, the lighting unit 1 achieves high color purity in R, G, and B, and realizes high color reproducibility.

The chassis 13 has an opening on a surface thereof from which irradiation light is outputted to a display panel from the light sources while inner surfaces of other sides are reflective so that irradiation light can be used effectively.

The fluorescent lights 11 are preferably arranged such that a pitch between neighboring fluorescent lights 11 is substantially 2L, and a pitch between the endmost fluorescent light 11 and the end portion of the chassis in the direction X is substantially L. Each fluorescent light 11 illuminates areas on both sides thereof in a range that is about equal to L. As a result, the outgoing light from all the fluorescent lights 11 attains substantially uniform light intensity across the irradiation plane. The irradiation plane refers to a plane parallel to the surface from which outgoing light is outputted and is expressed in an XY plane in FIG. 1.

On the other hand, the LEDs 12 are preferably arranged so that LEDs 12A are respectively arranged between the neighboring fluorescent lights 11, and LEDs 12B, whose light intensity is weaker than that of LEDs 12A, are located at an endmost position at the end portions of the chassis 13. As a result, a pitch between LEDs 12 neighboring in the direction X is substantially 2L. Likewise, a distance between the endmost LED 12 at the end portion and the end portion surface of the chassis 13 in the direction X is 2L. Therefore, the light intensity of the LEDs 12A is insufficient at the end portions of the chassis 13, and is not uniform across the irradiation plane.

The lighting unit 1 of the present preferred embodiment is equipped with the LEDs 12B, which act as auxiliary light sources for compensating for the insufficient light intensity of the LEDs 12A at the end portions. It is preferable that the light intensity of the LEDs 12B is weaker than that of the LEDs 12A since the inner surfaces of the chassis 13 are reflective. In consideration of the reflective inner surfaces, the light intensity of the LEDs 12B is preferably set at about 50% of that of the LEDs 12A.

Figure 2:
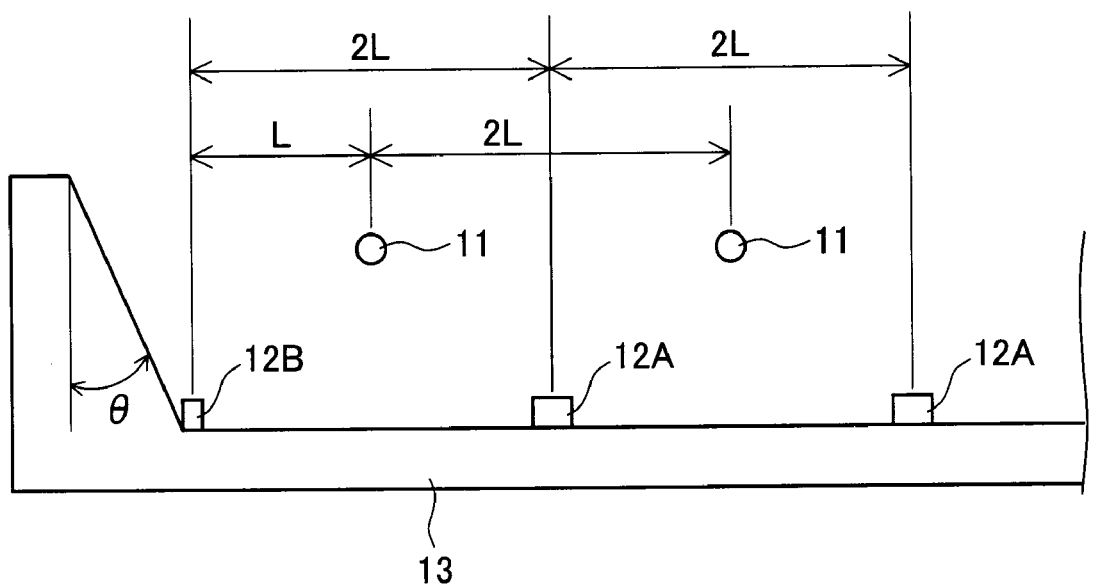
FIG. 2 is a view showing an angle at an end portion surface of the lighting unit of FIG. 1.

The end portion surfaces of the chassis 13 are not necessarily vertical to a light source alignment surface (the bottom surface of the chassis 13 in other words), and may have an angle θ as FIG. 2 shows. The light intensity of the LEDs 12B is preferably adjusted within a range of about ±30%, according to the angle θ.

The angle θ is usually set within a range from about 0° to about 45° and is generally set within a range from about 20° to about 25°. The light intensity of the LEDs 12B is preferably set at about 50% of that of the LEDs 12A when the angle θ is from about 20° to about 25°.

The smaller the angle θ becomes, the stronger the light intensity should be set. Therefore, when the angle θ is 0°, the light intensity of the LEDs 12B is preferably set at about 80% (about 50%+about 30%) of that of the LEDs 12A. This is because if the angle is small, the light reflected by the inner surfaces of the chassis 13 is less likely to be reflected to the outputting surface side, and hardly contributes to increases in the light intensity at the end portions.

In contrast, the light intensity of the LEDs 12B is preferably set weaker as the angle θ become bigger. Therefore, when the angle θ is about 45°, the light intensity of the LEDs 12B is preferably set at about 20% (about 50%-about 30%) of that of the LEDs 12A. This is because if the angle θ is bigger, the light reflected by the inner surfaces of the chassis 13 is more likely to be reflected to the outputting surface side, and contributes more to the increases in the light intensity at the end portions.

In consideration of these factors, the light intensity of the LEDs 12B is preferably set within the range from about 20% to about 80% of the light intensity of the LEDs 12A.

In the explanation above, the LEDs 12B are preferably provided at the end portions of the lighting unit 1 so as to achieve uniform light intensity of the LEDs 12 at the end portions. Yet, the present invention is not limited to this configuration. Instead, the present invention may have a configuration where light intensity adjustment is made with the fluorescent lights 11 at the end portions as FIG. 3 illustrates.

Figure 3:
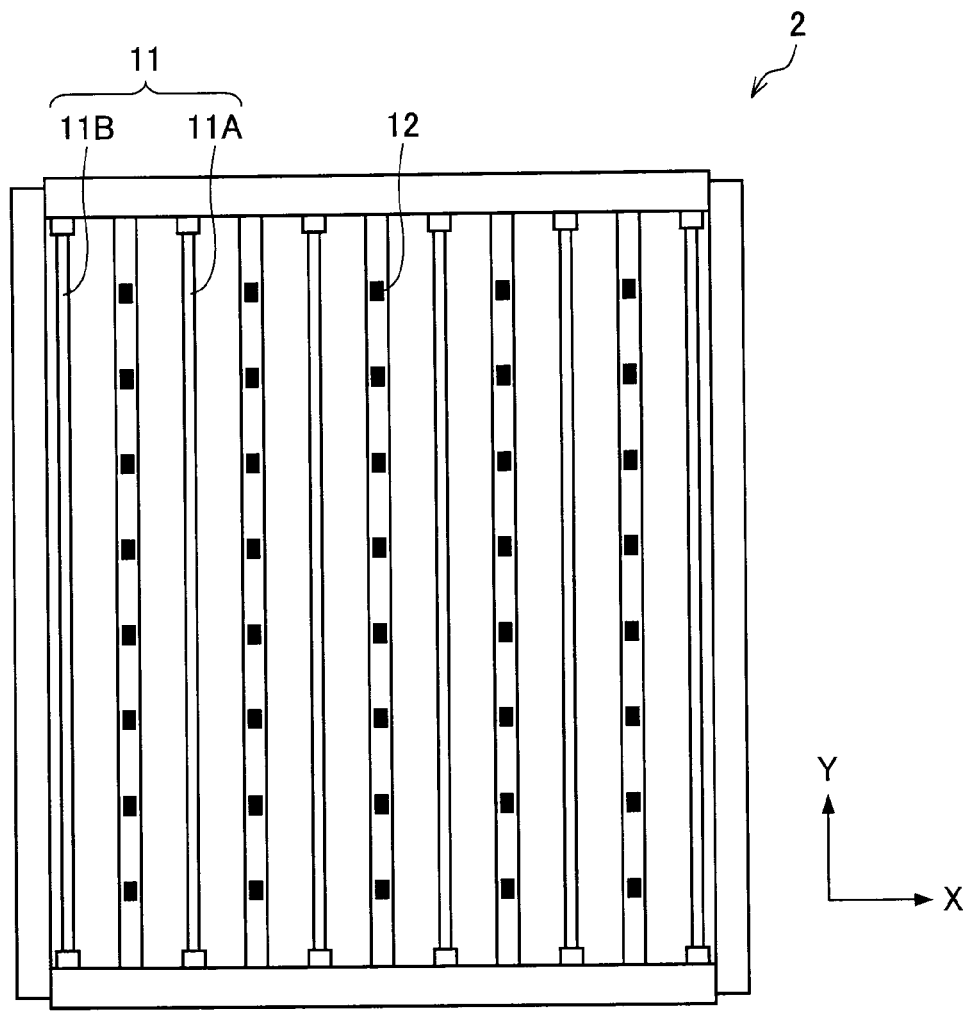
FIG. 3 is a view illustrating another preferred embodiment of the present invention, schematically illustrating a configuration of a lighting unit.
Figure 3:
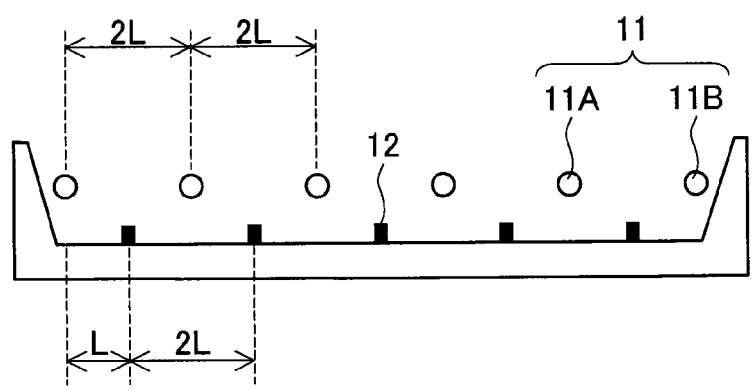

That is, in a lighting unit 2 illustrated in FIG. 3, the LEDs 12 are arranged such that a pitch between the neighboring LEDs 12 is substantially 2L and a pitch between the endmost LED 12 and the end portion surface of the chassis 13 in the direction X is substantially L. Consequently, outgoing light from all the LEDs 12 has uniform light intensity across the irradiation plane.

The fluorescent lights 11 are arranged such that fluorescent lights 11A are arranged respectively between the neighboring LEDs 12. Furthermore, fluorescent lights 11B, the light intensity of which is weaker than that of the fluorescent lights 11A, are arranged at the end portions. In other words, the lighting unit 2 includes the fluorescent lights 11B as the auxiliary light sources for compensating for the insufficient light intensity of the fluorescent lights 11A at the end portions. The light intensity of the fluorescent lights 11Bs is preferably weaker than that of the fluorescent lights 11A, and as in the case of the LEDs 12B, the light intensity of the fluorescent lights 11B is preferably set within the range from about 20% to about 80% of that of the fluorescent lights 11A.

Figure 4:
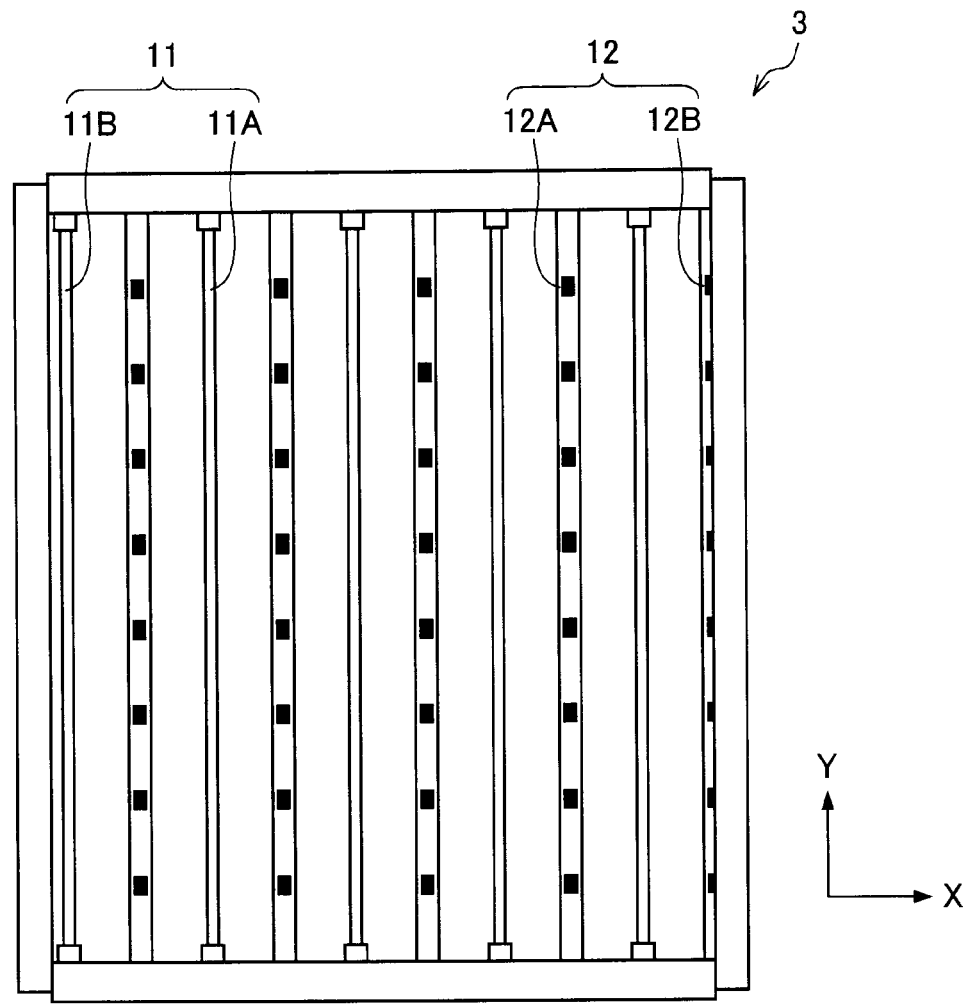
FIG. 4 is a view illustrating still another preferred embodiment of the present invention, schematically illustrating a configuration of a lighting unit.
Figure 4:
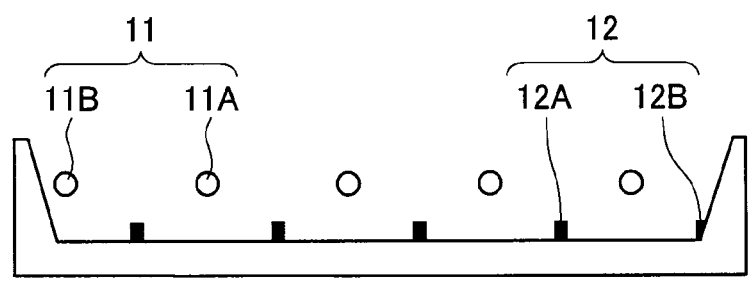

Furthermore, as FIG. 4 illustrates, the light intensity adjustment can be performed with LEDs 12 at one end portion and with fluorescent lights 11 at the other end portion. That is, a lighting unit 3 illustrated in FIG. 4 compensates for the insufficient light intensity of the fluorescent lights 11A at the end portion by providing the fluorescent light 11B as the auxiliary light source at one end portion (left end portion in FIG. 4) while it compensates for the insufficient light intensity of the LEDs 12A at the end portion by providing the LEDs 12B as the auxiliary light source at the other end portion (right end portion in FIG. 4).

The above explanation of the lighting unit 1 to 3 is based on the examples in which red spectrum characteristics are eliminated from the fluorescent lights 11. Therefore, the fluorescent lights 11 have blue spectrum characteristics and the green spectrum characteristics while the LEDs 12 have red spectrum characteristics. Yet, the present invention is not limited to this exemplary configuration. In fact, the LEDs 12 may be LEDs having blue spectrum characteristics. Accordingly, blue spectrum characteristics may be eliminated from the fluorescent lights 11. Therefore, the fluorescent lights 11 having red spectrum characteristics and green spectrum characteristics may be combined with the LEDs 12.

Moreover, in the configuration wherein the second light sources are LEDs, the second light sources may be LEDs having more than two different spectroscopic characteristics. For example, LEDs having red spectrum characteristics and LEDs having blue spectrum characteristics may be used for the LEDs 12 while fluorescent lights to be combined with them may have at least green spectrum characteristics. (The fluorescent lights may also have spectrum characteristics other than green ones.) With the configuration in which the LEDs having more than two different spectroscopic characteristics are used, the present invention is applicable to provide uniform light intensity in a direction Y that is substantially perpendicular to the direction X on the irradiation plane.

Figure 5:
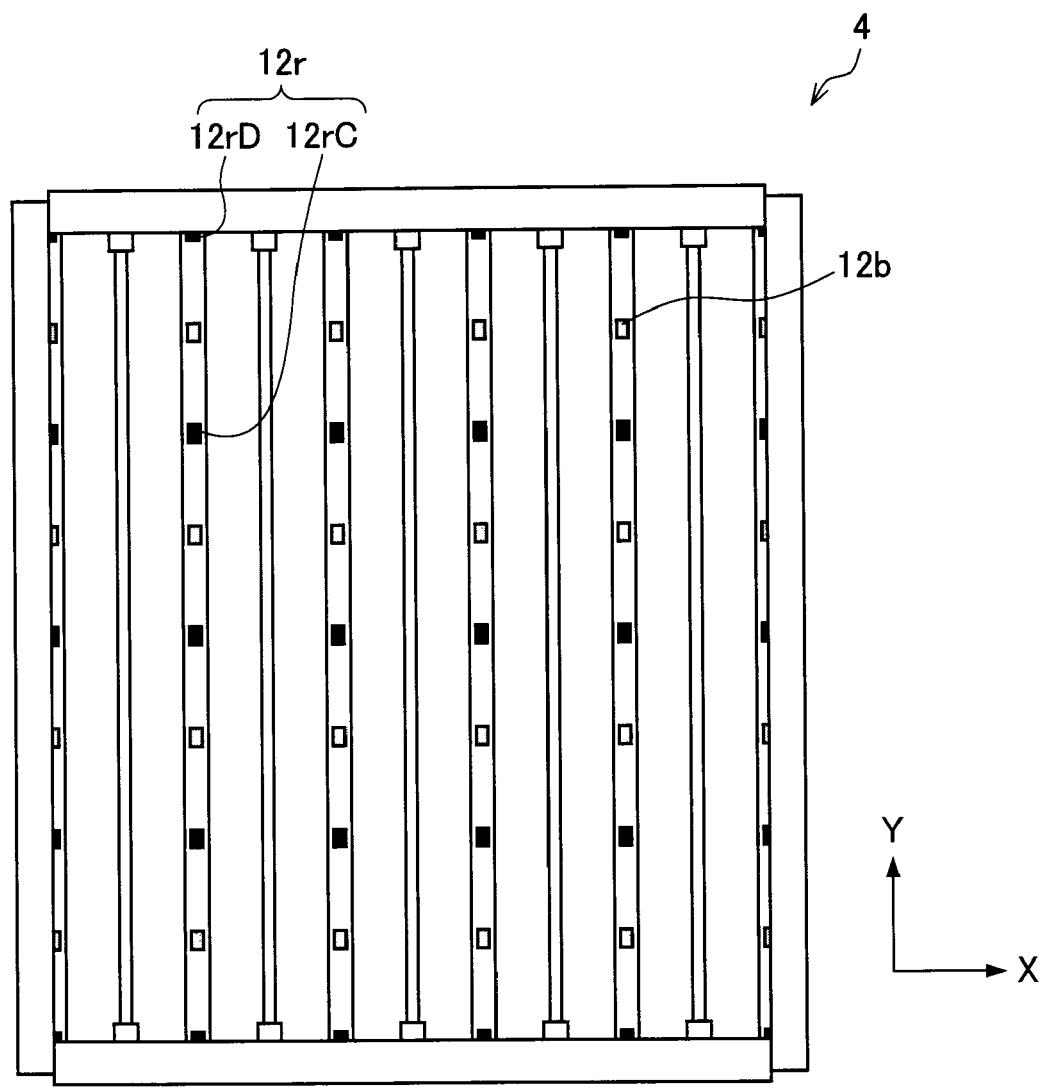
FIG. 5 is a view illustrating yet another preferred embodiment of the present invention, schematically illustrating a configuration of a lighting unit.

FIG. 5 illustrates an exemplary configuration where LEDs 12$r$ having red spectrum characteristics are used with LEDs 12$b$ having blue spectrum characteristics. In a lighting unit 4 illustrated in FIG. 5, the LEDs 12$r$ and the LEDs 12$b$ are alternately arranged in a single row of the LEDs 12 that is arranged between the neighboring fluorescent lights 11. At end portions of the array direction of the single row of the LEDs 12 (in other words, the direction Y of FIG. 5: a second array direction), LEDs that compensate for insufficient light intensity are provided. In FIG. 5, the LEDs 12$r$ having red spectrum characteristics are provided as the auxiliary LEDs for compensating for the insufficient light intensity at the end portions of the direction Y, yet the LEDs 12 having blue spectrum characteristics may be arranged instead. Furthermore, the LEDs provided at the ends as the auxiliary light sources may be a mixture of LEDs having blue spectrum characteristics and the LEDs having red spectrum characteristics.

For the same reason as in the light intensity adjustment at the end portions of the direction X, light intensity of LEDs 12D, which are auxiliary light sources arranged at the ends to compensate for the insufficient light intensity at the end portions of the direction Y, is preferably set within the range from about 20% to about 80% of that of LEDs 12C having same spectrum characteristics, which are arranged in the rows except at the ends. Therefore, in FIG. 5, the light intensity of the LEDs 12$r$D is preferably set within the range from about 20% to about 80% of that of the LEDs 12$r$C.

In addition, the lighting unit of the present preferred embodiment may include a light controller arranged to control emission intensity of either the first light sources or the second light sources therewith. As a result, it is possible to blend the light of the both light sources with good balance to provide white light, which makes the lighting unit suitable to be used as a backlight.

Figure 6:
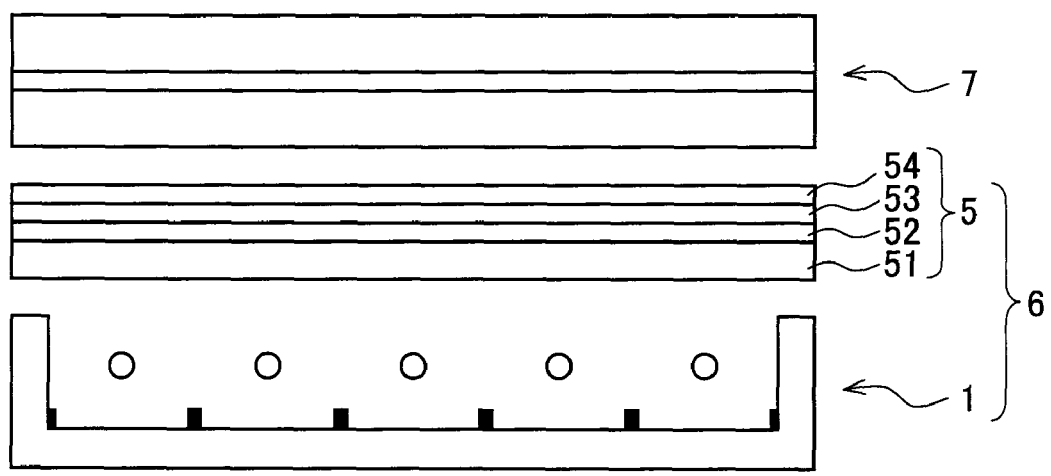
FIG. 6 is a view schematically illustrating a configuration of a liquid crystal display device including the lighting unit.
Figure 7:
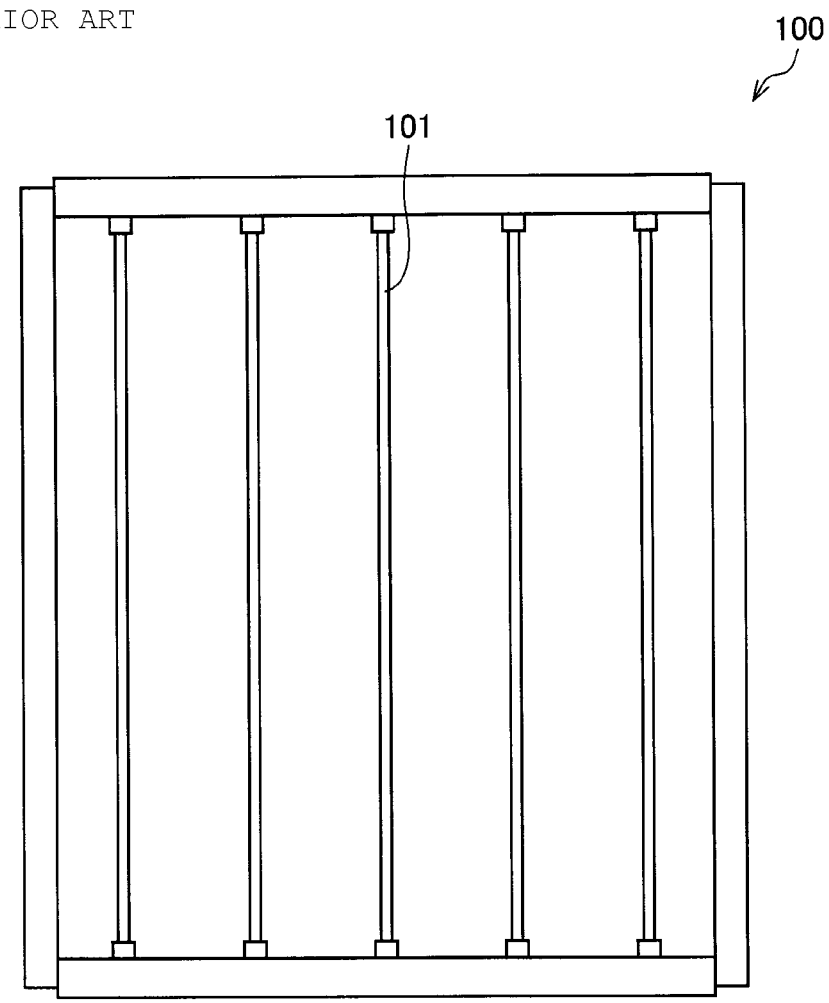
FIG. 7 is a view schematically illustrating a configuration of a conventional lighting unit.
Figure 7:
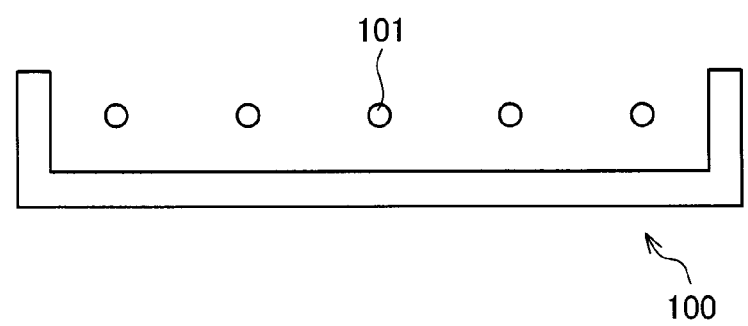
Figure 8:
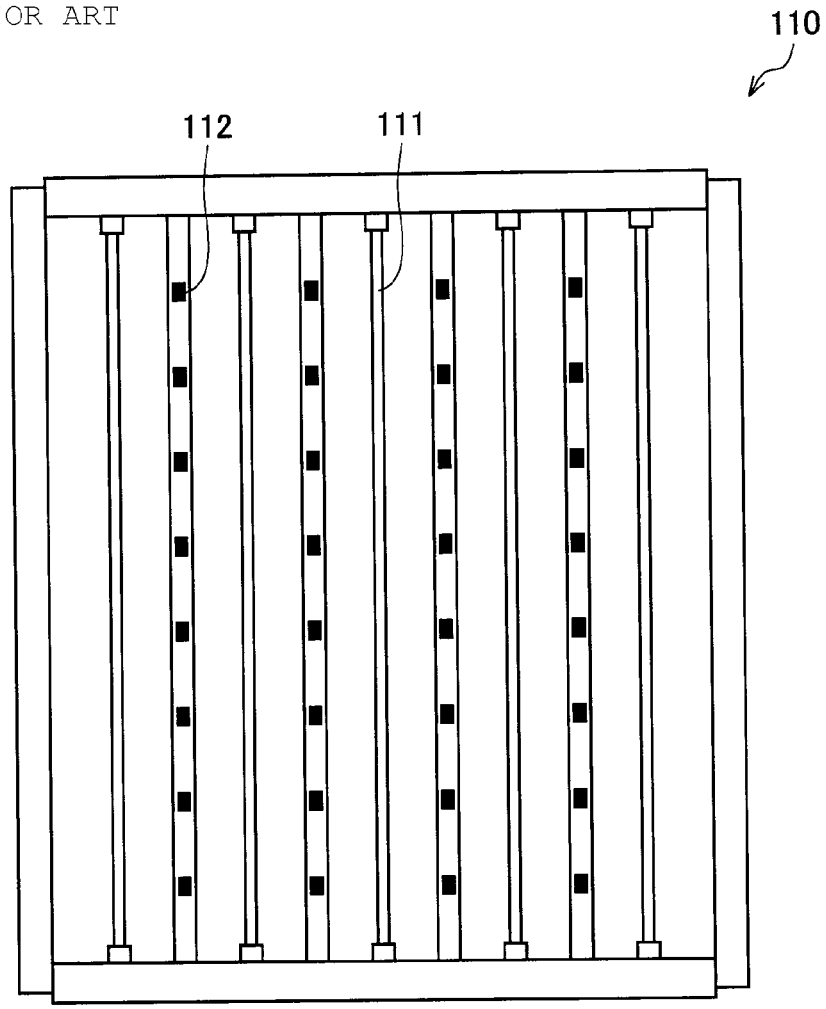
FIG. 8 is a view schematically illustrating a configuration of a conventional lighting unit.
Figure 8:
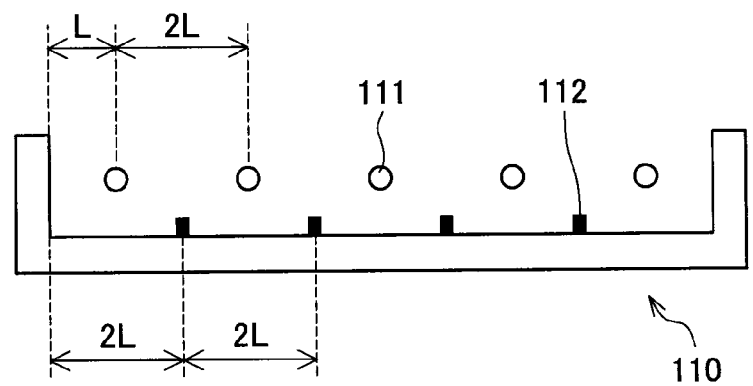

When one of the lighting units 1 to 4 as described above is used as a backlight unit of a liquid crystal display device, an optical member, which gives the light distribution characteristic and a brightness distribution characteristic to the irradiation light, is preferably provided on the outputting side of the lighting unit. For example, a backlight unit 6 illustrated in FIG. 6 includes an optical member 5 including: a diffusing plate 51; a diffusing sheet 52: a prism sheet 53; and a reflection polarization sheet 54. FIG. 6 illustrates an exemplary configuration using the lighting unit 1, and the lighting unit 2, 3, or 4 may be configured with the optical member 5, when the lighting unit 2, 3, or 4 is used as the backlight unit.

Besides, the backlight unit 6 is installed with a liquid crystal panel 7 to display an image when it is used in a liquid crystal display device.

As described above, a lighting unit according to various preferred embodiments of the present invention including the first light sources and the second light sources, having different spectroscopic characteristics and being alternately arranged in the first array direction on an irradiation plane, is arranged such that at least either the first light source or the second light source that is located at an endmost position at least one of ends in the first array direction includes an auxiliary light source, whose light intensity is weaker than light intensity of the other light sources identical with the auxiliary light source in spectroscopic characteristics.

As described above, in the lighting unit where the first light sources and the second light sources having different spectroscopic characteristics are alternately arranged in the first array direction, those two types of light sources need to be arranged without overlapping each other. Therefore, the conventional configuration, where light sources of equal light intensity are regularly arranged for the first light sources and the second light sources, respectively, cannot provide the display light uniform in the both types of light sources particularly around the end portions.

On the other hand, according to the configuration of various preferred embodiments of the present invention, either first light sources or second light sources are arranged such that substantially uniform light intensity can be obtained around the end portions in the first array direction whereas the other light source located at an endmost position at least one of the ends of the first array direction includes the auxiliary light source whose light intensity is weaker than the light intensity of the other light sources of the same color. With this unique configuration, substantially uniform light intensity can be obtained around end-portions in the first array direction. Consequently, in the lighting unit including the first light sources and the second light sources of different spectroscopic characteristics, uniform light intensity over the entire irradiation plane is achieved.

The lighting unit is preferably arranged such that the first light sources are fluorescent lights and the second light sources are LEDs or electro-luminescences.

According to the lighting unit described above, the first light sources preferably are the fluorescent lights high in power efficacy (for example, cold-cathode tubes) and furthermore, the second light sources preferably provide a color having low color purity. As a result, a lighting unit having high color reproducibility can be realized.

The lighting unit is preferably arranged such that the light intensity of the auxiliary light sources is within a range from about 20% to about 80% of the light intensity of the light sources of the same color. According to the configuration described above, the auxiliary light sources are prevented from excessively raising the light intensity at the end portions.

Also, in the lighting unit described above, the second light sources may include two types of LEDs, having different spectroscopic characteristics and being alternately arranged in the second array direction perpendicular to the first array direction on the irradiation plane, whereas at least either type of LEDs located at an endmost position at least one of ends in the second array direction includes auxiliary light sources, whose light intensity is weaker than light intensity of the other light sources identical with the auxiliary light sources in spectroscopic characteristics.

According to the configuration described above, either type of the LEDs are arranged such that substantially uniform light intensity can be obtained around the end portions in the second array direction whereas the other type of the LEDs located at an endmost position at least one of the ends of the second array direction includes the auxiliary light sources whose light intensity is weaker than the light intensity of the other light sources of the same color. With this unique configuration, substantially uniform light intensity can be obtained around the end portions in the second array direction.

The lighting unit is preferably arranged such that the light intensity of the auxiliary LEDs is within a range from about 20% to about 80% of the light intensity of other LEDs of the same color.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

The invention claimed is:

1. A lighting unit comprising:
    first light sources and second light sources, having different spectroscopic characteristics and being alternately arranged to be spaced apart at uniform intervals in a first array direction on an irradiation plane; wherein
    at least either the first light source or the second light source that is located at an endmost position at at least one end in the first array direction comprises an auxiliary light source arranged to make uniform a light intensity at the at least one end with a light intensity of all other portions of the lighting unit by compensating for insufficient light intensity at the at least one end, the auxiliary light source providing a light intensity which is weaker than a light intensity provided by the other light sources of the lighting unit that have identical spectroscopic characteristics as that of the auxiliary light source.

2. The lighting unit as set forth in claim 1, wherein the first light sources have at least one of emissive spectra R, G, and, B and the second light sources have the remaining emissive spectra.

3. The lighting unit as set forth in claim 2, wherein the first light sources are fluorescent lights and the second light sources are LEDs or electro-luminescent light sources.

4. The lighting.unit as set forth in claim 1, wherein the light intensity of the auxiliary light source is within a range from about 20% to about 80% of the light intensity of the other light sources identical with the auxiliary light source in spectroscopic characteristics.

5. The lighting unit as set forth in claim 1, wherein:
    the second light sources comprise at least two kinds of LEDs having different spectroscopic characteristics and being alternately arranged in a second array direction substantially perpendicular to the first array direction on the irradiation plane; and
    at least one kind of the LEDs located at the endmost position at at least one of ends in the first array direction is the auxiliary light source defined by an auxiliary LED whose light intensity is weaker than light intensity of the other LEDs identical with the auxiliary LED in spectroscopic characteristics.

6. The lighting unit as set forth in claim 5, wherein the light intensity of the auxiliary LED is within a range from about 20% to about 80% of the light intensity of other LEDs of the same color.

7. The lighting unit as set forth in claim 1, wherein the first light sources are driven by a DC/AC conversion driving method with an electric transformer while the second light sources are driven by a direct-current voltage inputting method.

8. The lighting unit as set forth in claim 1, further comprising a light controller arranged to control brightness of the light sources, wherein emission intensity of at least either the first light sources or the second light sources is controlled by the light controller.

9. The lighting unit as set forth in claim 1, wherein the second light sources have a relatively wide-angled radiation directivity as compared to a relatively narrow-angled radiation directivity of the first light sources.

10. The lighting unit as set forth in claim 1, wherein the second light sources exceed the first light sources in number.

11. A backlight unit comprising:
    a lighting unit as set forth in claim 1; and
    an optical member arranged to provide a light distribution characteristic and a brightness distribution characteristic to irradiation light of the lighting unit.

12. A liquid crystal display device comprising:
    a backlight unit as set forth in claim 11; and
    a liquid crystal display panel arranged to receive light from the backlight unit and generate a display.

* * * * *